G. W. LUHRMANN.
METHOD OF PROCESSING.
APPLICATION FILED JAN. 13, 1916.
1,184,253.
Patented May 23, 1916.
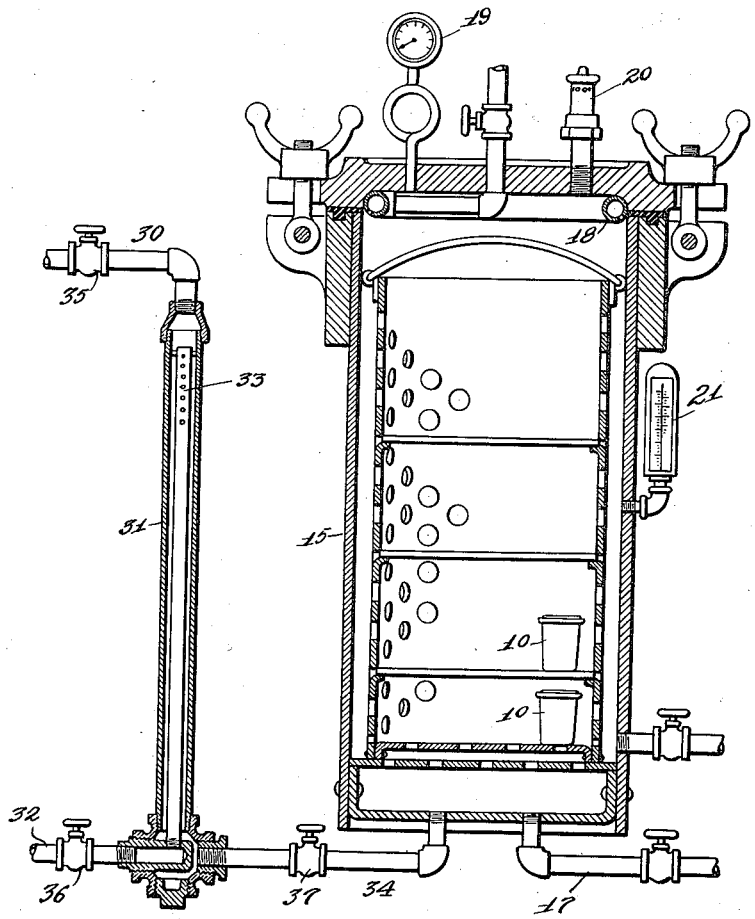

UNITED STATES PATENT OFFICE.

GEORGE W. LUHRMANN, OF JERSEY CITY, NEW JERSEY, ASSIGNOR TO ANCHOR CAP & CLOSURE CORPORATION, OF BROOKLYN, NEW YORK, A CORPORATION OF NEW YORK.

METHOD OF PROCESSING.

1,184,253.   Specification of Letters Patent.   Patented May 23, 1916.

Application filed January 13, 1916. Serial No. 71,955.

*To all whom it may concern:*

Be it known that I, GEORGE W. LUHRMANN, a citizen of the United States, residing at Jersey City, in the county of Hudson and State of New Jersey, have invented new and useful Improvements in Methods of Processing, of which the following is a specification.

This invention relates to methods for preserving food and the like, and has particular reference to the processing of foodstuffs in glass receptacles or other forms of sealed containers.

The objects of the invention include a method adapted to permit the use of steam and compressed air in processing without creating sudden and dangerous pressures within the retort; another object is to provide a method in which the processing is not so directly dependent upon careful manipulation by the operator.

Referring to the drawings: The figure is a sectional elevation of a processing retort and apparatus adapted to carry out the process.

In the processing of food packed within containers under the pressure of steam and compressed air, great difficulty has been experienced in keeping the pressure within the retort regulated within proper limits. Ordinary retorts commercially used, are not able to withstand with safety a pressure much greater than 30 pounds gage. On the other hand, should the pressure in the retort drop below the point of the internal pressure of the sealed container during the processing, the tops of the containers are liable to be blown off, or their gaskets blown out, if the closures are clamped in position upon the containers.

In the former methods of admitting steam and compressed air directly into the retort, very sudden and dangerous fluctuations of pressure are caused. No matter how carefully the steam is admitted to reach or to maintain the desired temperature, or the compressed air is admitted to reach or maintain the desired pressure, there is always a considerable reaction between the steam and compressed air as they come into contact with one another within the retort. The compressed air entering the retort tends to expand, reducing both its temperature and pressure; as soon, however, as it comes into contact with any quantity of live steam, it is suddenly expanded and as suddenly creates a powerful pressure within the retort. The steam coming in contact with the compressed air, which has a higher pressure than the steam, is principally condensed, giving up large quantities of heat but itself reducing its volume to a very great extent by being converted into water. It is impossible to determine just exactly what does take place in the actions of the steam and compressed air upon each other under these conditions; but the results of these actions are very clear and determinable. There are relatively great fluctuations of temperature, and very often there is a very great fluctuation in pressure; the pressure being so great even when the apparatus is carefully manipulated as to approach the bursting point of the retort. This pressure is created so suddenly, that the provision of a safety valve is hardly enough in itself to relieve the retort from dangerous pressures.

My improved process consists in forming an intimate mixture of the steam and compressed air before or as they pass into the retort, thereby preventing any comparatively large body of compressed air or steam from being suddenly subjected to the action of the other. In this process the steam and compressed air are mixed in small quantities and are permitted to affect the temperature and pressure within the retort only after they have been so mixed.

In the drawing, 10 represents the containers which are preferably sealed under a vacuum and placed within the retort 15. The retort is provided with suitable connections for the admission and discharge of water as a water outlet 17 and rose inlet 18, and is further provided with pressure gage 19, safety valve 20 and thermometer 21. The steam is applied through a pipe 30, from which it passes into a chamber 31. The compressed air is supplied through a pipe 32, which terminates within the chamber 31, and at its upper end it is provided with numerous small perforations 33 through which the air is discharged. As the air passes through these perforations, it comes into contact with the steam in the chamber 31; the gas and vapor mix at this point and pass down together through the pipe 34 into the retort. Valves 35, 36, 37 control the movements of steam and air described.

With the arrangement shown, the fluctuations of pressure due to the meeting of the air and steam, are comparatively slight and such as they are, they affect the pressure within the retort but very little, as the cubic capacity of the retort is very much greater than that of the mixing chamber 31.

The effect of this mixing chamber is probably to deliver highly heated compressed air of great humidity and water of condensation to the retort, but the exact thermodynamic effect is not important. In the process as described, dangerous pressures are not created within the retort and there are no extreme variations in temperature, so that the process does not require either highly skilled operators, or continuous vigilance on the part of the attendant.

I claim:

1. The method of preserving food which consists in packing the material in a container, placing the container in a retort, mixing steam and compressed air together and then subjecting the container within the retort to the said mixture, in order that the container may be subject to a sterilizing temperature and a pressure that is greater than the pressure within the container.

2. The method of preserving food which consists in packing the material in a container, mixing steam and compressed air together and then exposing the container to the mixture, whereby the container is subjected to a sterilizing temperature and to a pressure that is greater than the pressure generated within the container by the sterilizing temperature.

3. The method of preserving food which consists in packing the material in a container, placing the container in a retort, mixing steam and compressed air in a mixing chamber, passing the mixture into the retort whereby the container is subjected to a sterilizing temperature and to a pressure that is greater than the pressure within the container.

4. The method of preserving food which consists in packing the material in a container, sealing the container in a vacuum, placing it in a retort, mixing steam and compressed air together and then subjecting the container to the mixture, whereby the container is subjected to a sterilizing temperature and to a pressure that is greater than the pressure generated within the container by the sterilizing temperature.

GEORGE W. LUHRMANN.